United States Patent [19]

Davis

[11] Patent Number: 5,037,540

[45] Date of Patent: Aug. 6, 1991

[54] PLATE AND CELL HOLDER

[75] Inventor: Steven S. Davis, Farmington, Utah

[73] Assignee: Baker Hughes Incorporated, Houston, Tex.

[21] Appl. No.: 441,858

[22] Filed: Nov. 27, 1989

[51] Int. Cl.⁵ .............................................. B01D 25/12
[52] U.S. Cl. .................... 210/136; 100/198; 100/199; 204/253; 210/225; 210/227; 210/230
[58] Field of Search ............... 210/97, 136, 224, 225, 210/227, 230; 204/253, 252; 100/194, 196, 197, 198, 199, 200

[56] References Cited

U.S. PATENT DOCUMENTS

| | | | |
|---|---|---|---|
| 4,107,042 | 8/1978 | Heinrich et al. | 210/225 |
| 4,129,495 | 12/1978 | Fitch et al. | 204/253 |
| 4,196,084 | 4/1980 | Schotten | 210/224 |
| 4,343,235 | 8/1982 | Jones | 210/230 |
| 4,351,724 | 9/1982 | Jones | 210/230 |
| 4,362,616 | 12/1982 | Gehrmann et al. | 210/225 |
| 4,364,827 | 12/1982 | Guttman | 210/225 |
| 4,623,453 | 11/1986 | Davenport | 210/230 |
| 4,806,239 | 2/1989 | Davis | 210/225 |

Primary Examiner—W. Gary Jones
Attorney, Agent, or Firm—Skjerven, Morrill, MacPherson, Franklin & Friel

[57] ABSTRACT

A filter plate press or an electrolyzer cell has a series of filter plates or cell frames, respectively, which are moved as a stack against a press or cell headpiece by a follower moved by one or more rodded cylinders mounted on a fixed bracket. Scissors mechanisms extending on each side of the press/cell holder and between the bracket and follower assure precise parallel movement of the follower with respect to the headpiece. To accommodate any cumulative errors in the stack dimensions the scissor mechanisms are disengageable upon closure of the press/cell holder so that the follower has freedom to match the abutting surface of the plate/cell frame stack and thus evenly seal the abutting peripheral edges of the plates/cell frames. A pair of plate pawl-containing carriages mounted on a pair of synchronized lead screws extending parallel to a pair of plate/cell frame guide rails on the press are provided to assure simultaneous pick-up of opposed handles of each plate/cell frame being moved for cake discharge or plate/cell frame washing.

18 Claims, 5 Drawing Sheets

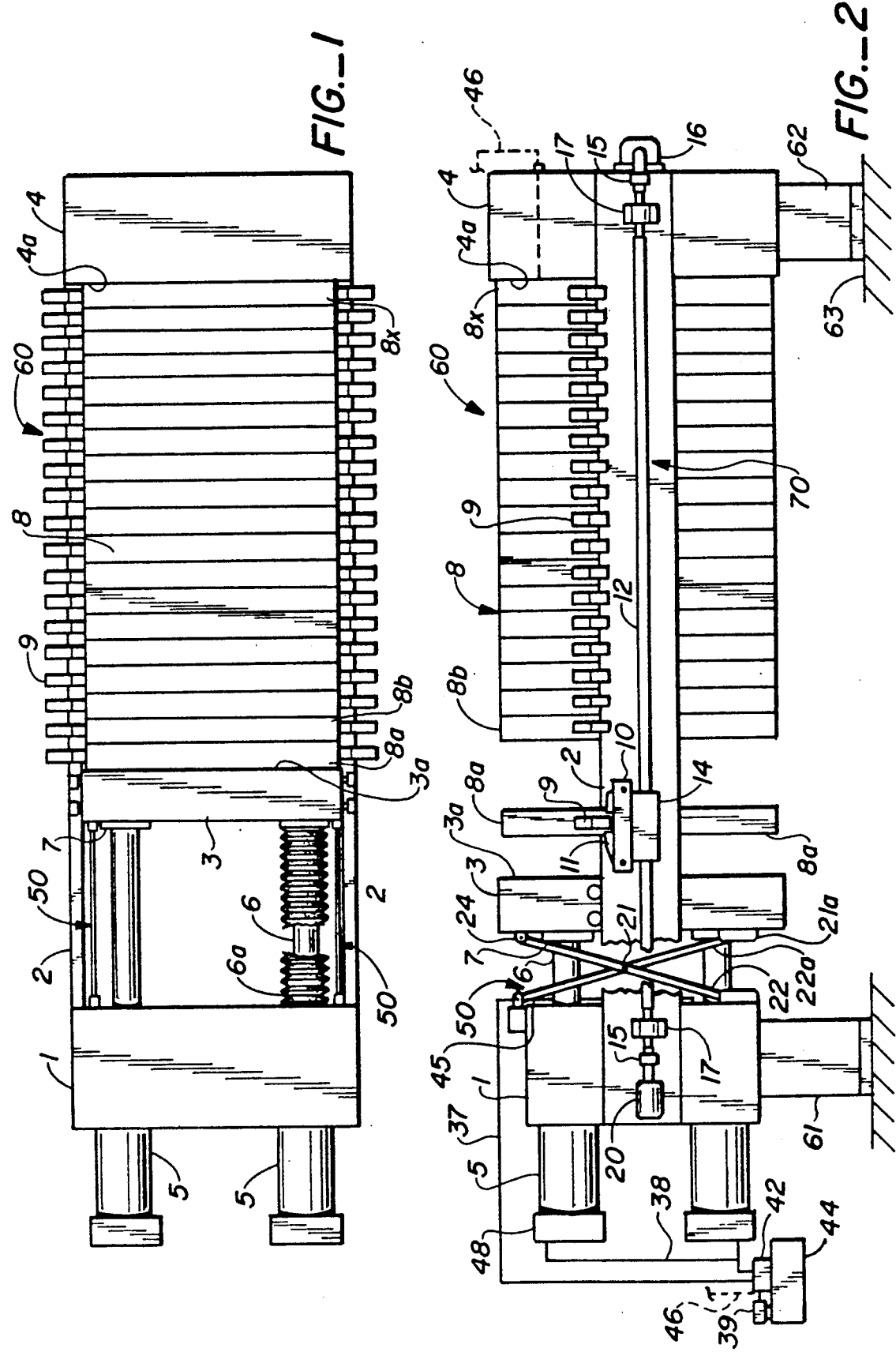

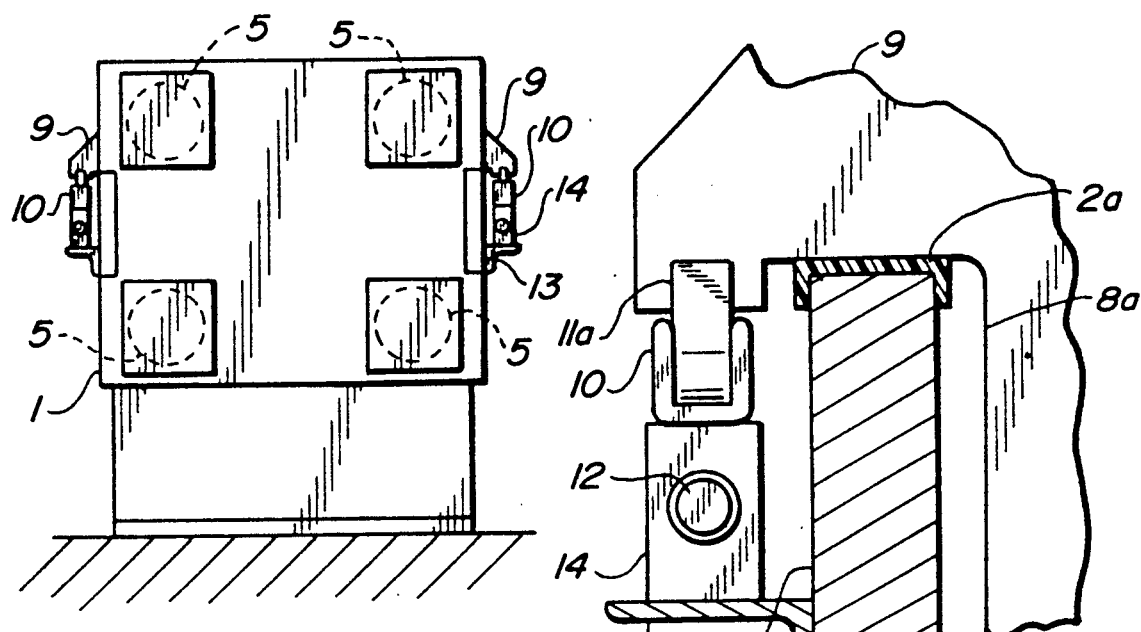
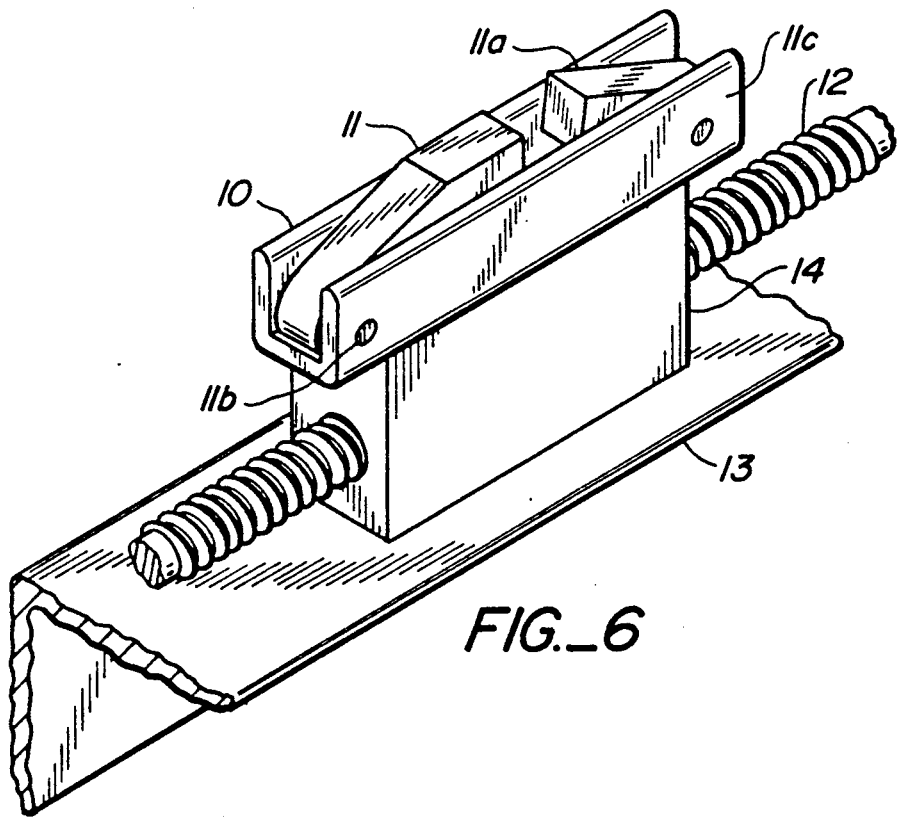

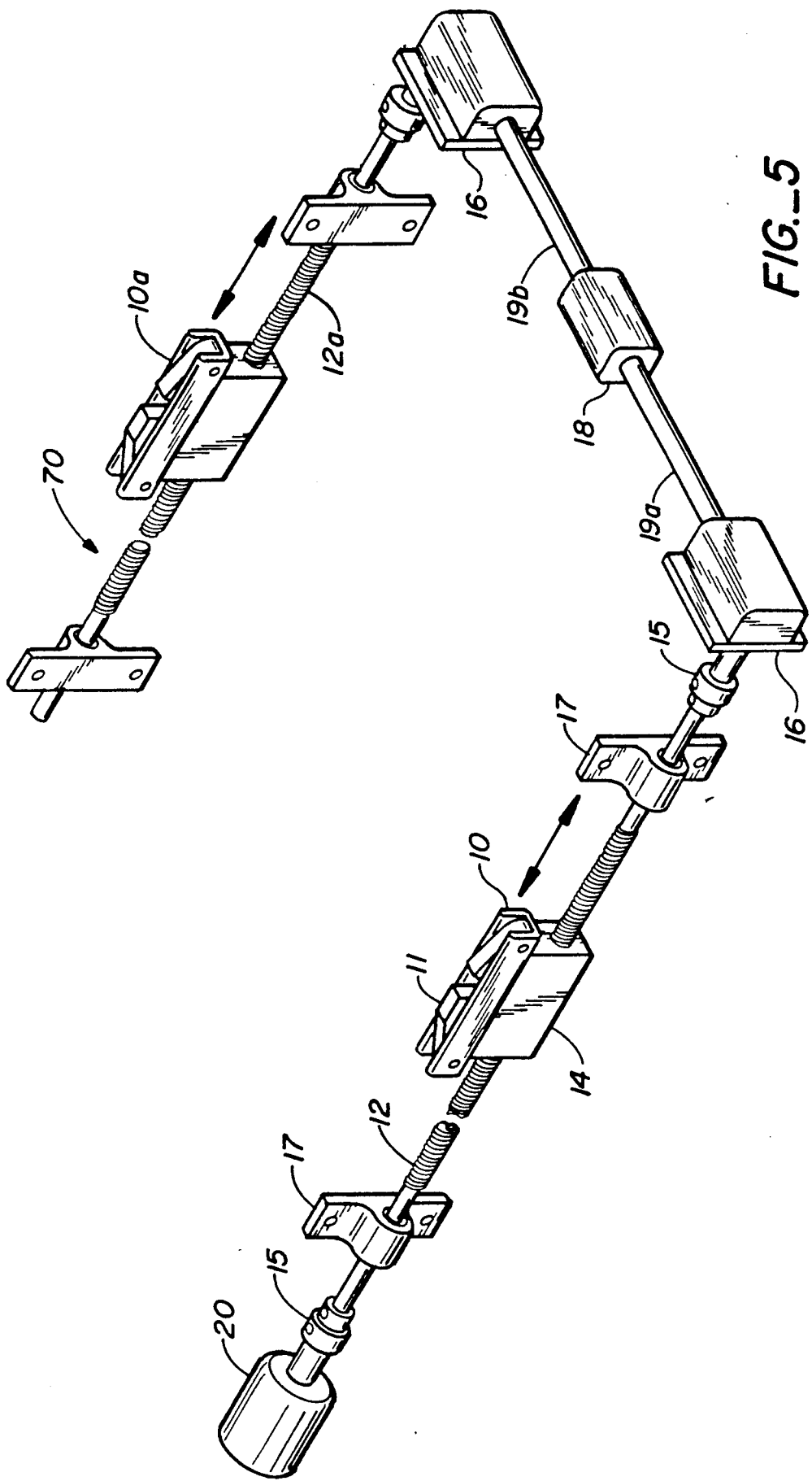

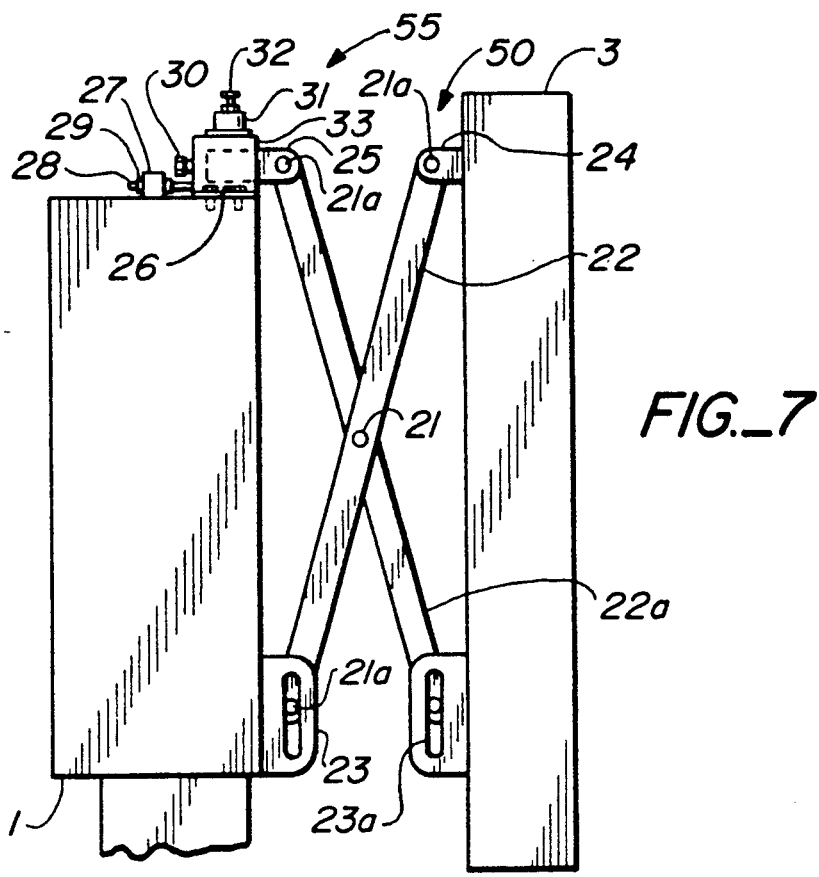
FIG._7
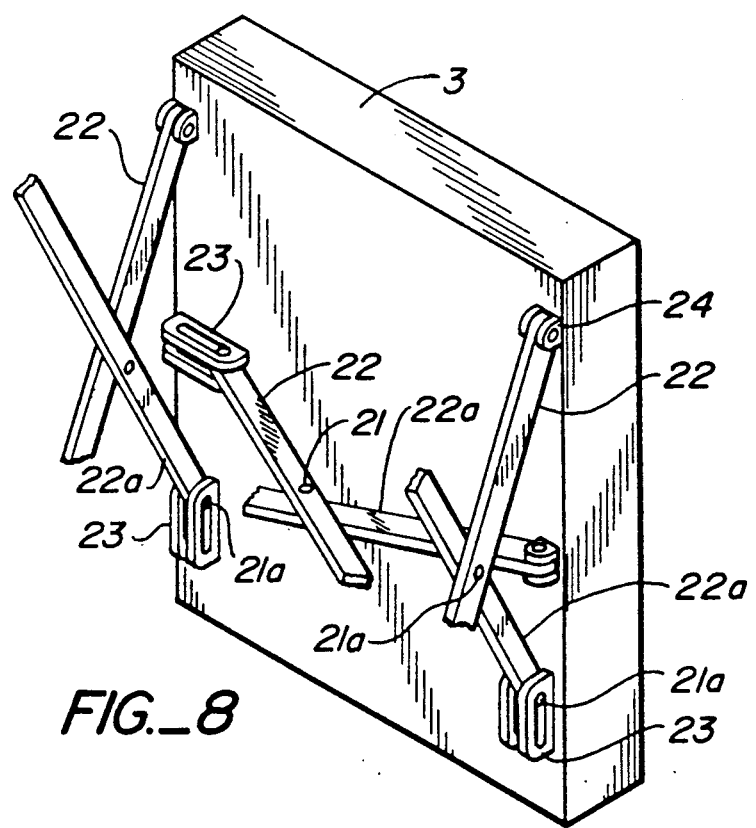
FIG._8

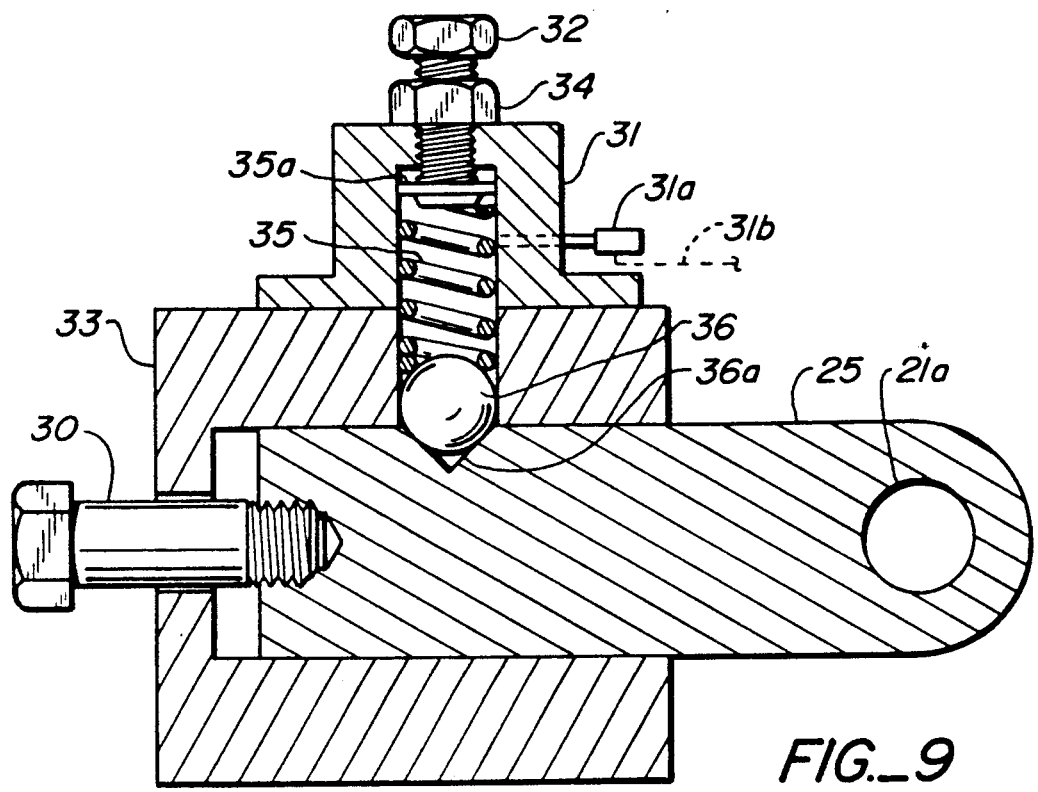
FIG._9
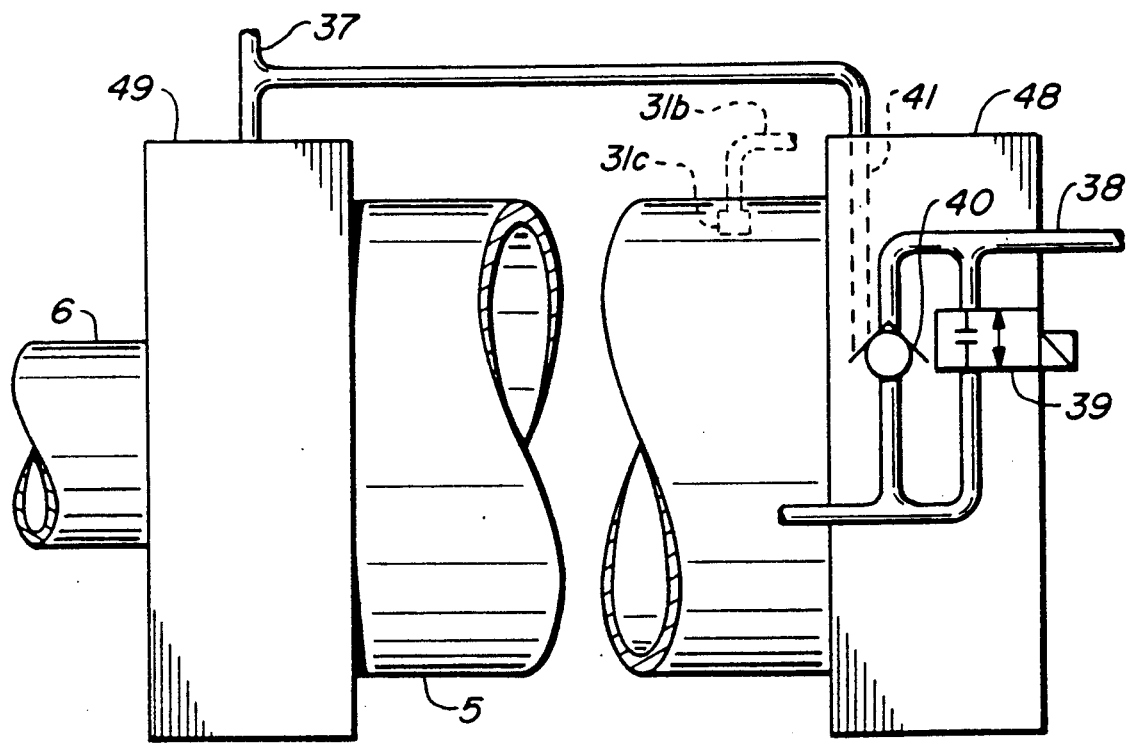
FIG._10

PLATE AND CELL HOLDER

BACKGROUND OF THE INVENTION

1. Field of the Invention

This invention relates to filler presses and electrolyzers, having respectively a plurality of plates for separating solids from liquids or a plurality of plate-like cells including a pair of anode and cathode compartments facing each other with an ion exchange membrane therebetween. More specifically the invention is directed to apparatus for assuring that a stack of plates or cells are precisely positioned with respect to a press/cell follower and head piece and are adequately sealed to prevent leakage.

2. Statement of Art

Prior art filter presses such as seen in U.S. Pat. Nos. 4,107,042; 4,364,827; and 4,806,239 all show presses which utilize a fixed head piece and a follower with a stack of plates therebetween where a hydraulic ram arrangement drives the follower against an end plate of the stack to move all the plates in the stack into engagement. The handles of plates normally slide on a pair of side slide rails or the plates are suspended from and movable on an overhead rail(s). Various pawl and piston arrangements mounted in a carriage have been proposed to shift individual ones or groups of plates in the stack for subsequent discharge of cake accumulated on filter media surfaces on the plates during the filtration cycle, and thereafter for washing the filter media surfaces on individual plates proparatory to another filtering cycle. In the case of electrolyzers a series of cell frames typically with a height of 1.2 meters and a width of 2.4 meters form a plate. Each plate is bisected by a metal partition wall forming anode and cathode compartments. Each compartment has an electrolyte inlet and an electrolyte and gas outlets, and an ion exchange membrane is installed between each anode compartment and cathode compartment. Handles are attached to each cell frame in order to hang the frames typically on side rails of a head and follower press. Due to the corrosive nature of the various materials being filtered, the electrolytes used and gases emitted from the operation of the electrolyzer, it has been necessary to have special seals and the like on the plates and cell frames to prevent egress of corrosive or other harmful unsafe products from the plate or cell press. Further, specifically in the case of the electrolyzer the ion exchange membrane between the cell frames is highly sensitive to a uniform sealing pressure. The press industry has generally relied on the use of precise rail surfaces and handle surfaces along with a center activated follower to insure a fair degree of alignment of the plates or cell frames with respect to one another. Despite these constructions it has been found that the plates and cell frames are difficult to align in parallelism since one or more plates or cell frames can become canted during movement of the follower to close the stack of plates or cell frames or cumulative manufacturing errors can cause misalignment.

SUMMARY OF THE INVENTION

The present invention addresses the problem of very accurately maintaining the follower of a press square with the fixed head piece and thereby to move each of the stacked plates or cell frames to a "stack closed" position with accurate alignment. At the same time, particularly in the case of the electrolyzer application involving cell frames, once the stack has reached which is called the nominal closed position by operation of the moving follower, the apparatus which assures rectilinear movement of the follower and parallelism of the facing surfaces of the follower and head piece is disengaged so that the follower is then free to match the stack facing surface when contact and the initial nominal closing is completed. The above action may be provided by a pressure switch associated with the closing cylinder(s) which closes as soon as stack closing pressure builds up to a predetermined pressure. Upon disengagement, the follower which is still being forced against the headpiece, more particularly the stack of plates/cell frames, is free of the controller rectilinear movement and can "match" the exact nominally vertical and horizontal orientation of the stacked plates/cell frames thus providing even pressure around the entire periphery of the facing plates/cell frames. The follower initially is kept rectilinear in motion by a means typically a pair of scissor mechanisms extending between a press follower and a fixed bracket supporting the cylinder casing. As the cylinder pressure builds to a certain pressure indicative of stack closure the scissors mechanism unlocks allowing free movement of the follower against the stack. The scissors mechanism is reengaged after the follower is fully retracted to a stack "open" position and squared with respect to the cylinder bracket. In another embodiment, a spring and detent ball arrangement operable when the follower contacts a stack out of parallelism with the follower, acts to disengage the scissors mechanism.

A further feature of the invention provides a pair of shifter carriages operable in a gear train so that the carriages have synchronous movement on both sides of the plates/cell frame stack. This is done by providing pawl-containing shifting carriages on each side of the press mounted on threaded screws rotated in a clockwise or counterclockwise direction by a single motor to move the carriages in unison. A connecting gear train and phase box extends between the screws to obtain exact precision of movement.

A further feature of the invention provides a special pilot operated check valve to maintain a cylinder(s) pressure(s) to accommodate changes in internal pressure of the plates or cells thus giving a constant sealing pressure on the sealing perimeter of abutting plates and cells.

BRIEF DESCRIPTION OF THE DRAWINGS

FIG. 1 is a top plan view of the press for stacking filter plates or cell frames.

FIG. 2 is a side view thereof.

FIG. 3 is an end view thereof.

FIG. 4 is a detailed partial end view of a shifter carriage and guide rail of the press.

FIG. 5 is a perspective view of the shifter carriages and connecting gearing positioned across the press side rails.

FIG. 6 is a perspective view of the shifter carriage and threaded screw drive.

FIG. 7 is a side view of a scissors-type mechanism of the invention for guiding the press follower in parallelism with the press head to contact and close the press plates or cell frames.

FIG. 8 is a perspective view thereof showing scissor mechanisms for both horizontal and vertical alignment.

FIG. 9 is a cross-sectional view of a release means for disengaging the scissors mechanisms upon press closure.

FIG. 10 is a schematic view of a built-in pilot operated check valve to maintain a constant seal pressure on the plate/cell frame perimeter as the pressure inside the plate/cell frame varies.

DETAILED DESCRIPTION

The press 60 shown in top view in FIG. 1 includes a cylinder bracket 1 fixedly supported at a ram end of the press across a pair of fixed support rails 2, a movable press follower 3 also extending across the rails and slidable or rollable thereon, a head piece 4 fixedly supported at a head end of the press, and a stack 8 of a series of parallel filter plates or cell frames 8a, 8b to 8x, sometimes known as cell holders, slidably carried by plate or frame handles 9 across the rails. One or more high pressure hydraulic cylinders 5, typically each providing from about 50 to 200 tons (U.S.) of closing force, are mounted on bracket 1. Cylinder piston rods 6, covered by flexible rubber boots 6a, extend out from the cylinders 5 and are affixed to a rod adapter 7 on the follower 3. The device above described is typically of the filter press and electrolyzer cell holder. As set forth in the summary of the invention is it highly desirous to move the follower with respect to the bracket so that the follower rides in parallelism, with the head piece. In erecting the press the fixed cylinder bracket 1 and headpiece 4 are aligned in accurate parallelism, with the dual side rails 2 being orthogonal thereto. Legs 61, 62 (FIG. 2) support the cylinder bracket and the headpiece and thus the overall press on a floor surface 63. The invention entails providing a means, typically in the form of a scissor mechanism 50, juxtaposed to each rail at opposite sides of the press and the press plates/cell frames, and extending between the cylinder bracket 1 and follower 3 parallel to the cylinder and its piston rod for assuring rectilinear motion of the follower so that the follower operating face 3a is parallel to the front face 4a of the headpiece 4.

As seen in FIG. 2 the scissor mechanism 50 includes a pair of scissor arms 22, 22a having a pivot pin 21 at a midpoint therebetween, each arm being pivoted at their ends in spaced lugs 24 on both the cylinder bracket and follower. The scissor mechanism is shown in more detail in FIGS. 7 and 8.

A plate/cell frame shifting mechanism 70 (not shown in FIG. 1) is connected (FIG. 2) along a side of the rails 2 for shifting one or a group of plates/cell frames to various positions between the follower and the head piece and with respect to the remaining plates/cell frames of the stack. The shifting mechanism comprising a threaded lead screw 12 mounting a plate/cell frame shifter carriage 10 having a threaded block 14 depending therefrom which block is movable along the lead screw in one direction or another dependent upon clockwise or counter-clockwise rotation of the lead screw. The lead screw 12 is supported on bearings 17 fixed on a support track 13 (FIG. 4) and connected to a reversible motor 20 by coupling 15. A right angle gear box 16 is provided to connect the screw 12 to another similarly mounted screw 12a on the opposite side rail through a phase box 18 (FIG. 5) so that both screws 12, 12a are driven by the common motor 20 in unison to provide simultaneous pick-up of the handles of a plate/cell frame on both sides of the press. Each of the shifter carriages 10 include at least two pawls 11 which may be shiftable and controlled in the same manner as set forth in U.S. Pat. No. 4,806,239 or as otherwise known in the filter plate press art. In FIG. 2 the pawls are shown in an UP position about to contact a plate/cell frame handle 9 to convey a plate/cell frame to a particular position on the rails for washing, loosely stacking or unstacking for cake discharge, media or membrane inspection, or other process step.

FIG. 3 is an end view of bracket 1 which shows the equidistant mounting of respective pairs of hydraulic cylinders 5 with the plate/cell frame handles 9 extending from each side of a plate/cell frame stack with the opposite shifter carriages 10 extending thereunder.

FIG. 4 is a blow-up of the plate handle-shifter mechanism interface showing pawl 11a picking up handle 9, i.e., abutting the move plate 8a slidingly along rail 2. A suitable rail cap 2a made of Teflon plastic or other suitable material on the top of rails 2 allows low friction for the moving plates. The threaded block 14 is slidable on a support track 13 extending from an outer edge 2b of rails 2. Track 13 also supports each of the screw bearings 17.

FIG. 5 shows the overall shifting mechanism 70 particularly the two right angle gear boxes 16, 16' connecting line shafts 19a, 19b transmitting rotary motion through a phase box 18. The phase box may be of the type manufactured by Cyclo-Index, Carthage, Mo. for providing a continuous positive mechanical relationship between the input and output shafts 19a, 19b respectively so as to synchronize the movements of carriage 10, 10a to simultaneously pick up or abut the opposite handles 9 of a particular plate.

FIG. 6 shows the shifter carriage in more detail particularly the shape of pawls 11, 11a and the pivoting movement about pivot pins 11b. Pawl 11 may be activated upward to move a plate left to right or pawl 11 activated upward to move a plate right to left. Both pawls may be activated downward in a known manner, to allow plate handles to pass over the top of the pawl housing 11c.

FIG. 7 shows the scissor mechanism 50 in more detail where scissor legs 22, 22a have a center mid-space pivot 21 and the ends of the legs are pivoted about pins 21a extending through pivot brackets 23, 24. Brackets 23 each included a vertical elongated slot 23a permitting the pivoted arms 22, 22a to raise as the distance between the cylinder bracket 1 and follower 3 increases. A disengagement mechanism 55 for the upper portion of arm 22a is provided so that when a particular press pressure is reached when the plates/cell frames are stacked in a closed position or an uneven force occurs resulting in disengagement of a detent ball in the mechanism, the follower becomes free of the restraint of the scissors mechanism allowing the follower to "match" the plates in the stack. It has been found that cumulative errors in the machining or manufacture of the plates/cell frames can amount to 0.5 cm or more in a stack of 60 plates/cell frames. When the follower hits a portion of the abutting plate/cell frame which represents the cumulative errors a high force can build up on that "high" spot such as at a corner, which can possibly damage a cell membrane held between two frames. The disengagement mechanism allows the follower to have a degree of freedom sufficient so that the follower plate-touching surface 3a (FIG. 2) can "match" or conform to the parallel or unparallel (due to the error buildup) exterior surface 8a' of the plate 8a in the stack. The upper end of scissors arm 22a is pivotably connected to a detent pivot arm 25 which extends into a detent arm housing 33, the latter mounted by bolts 26 to the cylinder bracket 1.

As more clearly shown in FIG. 9 the arm 25 is held in housing 33 by a detent ball 36 extending into a detent 36a in arm 25. The detent ball 36 is spring-activated by compression spring 35 extending from a spring housing 31 connected to housing 33. A spring compression capscrew 32 and jam nut 34 serves to adjust the compression of the spring by movement of spring plate 35a. A retaining bolt 30 is threaded into the inner end of arm 25, the head of the bolt 30 acting as a stop and allowing for limited outward movement of the arm 25 from housing 33 beyond the detent and detent ball aligned position so that the scissors arm 22a is not fixed by the detent and detent ball in housing 33. An adjustment screw 28 and lock nut 29 (FIG. 7) is mounted on lug 27 fixed to bracket 1 for adjustment of housing 33 to insure that the follower is parallel to the head. A small hydraulic cylinder 31a can be substituted for the spring mechanism so that upon a prescribed stack-closing main cylinder 5 pressure being reached the pressure is released on the ball allowing it to move out of notch 36a. Pressure switch 31c (FIG. 10) sends a pressure signal through line 31b to operate hydraulic cylinder 31a in this embodiment.

FIG. 8 illustrates a set of scissor mechanisms which extend in a central horizontal position inside the vertical pair scissor mechanisms. This insures that both vertical and horizontal parallelism is maintained resulting in planar parallelism. The horizontal scissors will also include a leg disengageable in the manner shown in FIG. 9.

FIG. 10 shows a built-in special pilot operated check valve. Check valves have been used in the head of a cylinder, but in the present invention pressure must be varied in order to maintain a constant seal pressure on the plate/cell perimeter as the pressure inside the plate/cell frame varies. Hydraulic oil pressure is introduced in line 38 and by-passes check valve 40 in case the pressure needs to be reduced. The cylinder pressure must be raised and lowered to accommodate changes in internal pressure of plates or cells thus giving a constant sealing pressure on the sealing perimeter of the plate or cell. This can be controlled by a 4-20 ma cell pressure signal indicated by dash line 46 from pressure switch 45 to a pumping unit 42 and the oil returns to tank 44 under control of control valve 39. This valve is held open by an electric or air or an hydraulic oil pilot. Upon loss of pilot signal, valve 39 automatically goes to N.C. (normally closed) position and check valve 40 locks the cylinder position. When opening the press/cell holder by oil pressure to line 39, check valve 40 is held open by oil pressure in line 41. Line 37 is the piston rod retract line while line 38 provides pressurized oil to extend the piston rod(s) from the cylinder(s). Cylinder end cap 49 is recessed in cylinder bracket 1 facing the plate or cell stack while cylinder end cap 48 is on the opposite side of bracket 1.

The above description of embodiments of this invention is intended to be illustrative and not limiting. Other embodiments of this invention will be obvious to those skilled in the art in view of the above disclosure.

I claim:
1. In a press for holding a stack of filter plates/cell frames shiftable on a pair of side rails, said press including a fixed bracket, a movable follower for closing and sealing said stack against a fixed head piece, and at least one closing cylinder on said bracket and having an associated piston rod extending between said bracket and said follower orthogonal to said follower; the improvement comprising first linkage means for providing rectilinear motion of said follower extending between said bracket and said follower and having a first link portion and a second link portion connected together each movable with said follower in engagement with said follower at a position juxtaposed to a first side of said press and extending parallel to said at least one cylinder; and a second linkage means for providing co-parallel rectilinear motion of said follower extending between said bracket and said follower and having a third link portion and a fourth link portion connected together each movable with said follower and in engagement with said follower juxtaposed to a second side of said press opposite said first side of said press and parallel to said first linkage means.

2. The improvement of claim 1 further comprising means for adjusting alignment of said first linkage means and said second linkage means to insure that said follower is parallel to said head piece.

3. The improvement of claim 1 further comprising means operable upon closure of said stack by said follower for disengaging said first means and second means from said follower.

4. The improvement of claim 1 further comprising a first shifter carriage positioned with respect to a first side rail on one side of the press, a second shifter carriage movable with respect to a second side rail on an opposite side of said press and means for connecting said shifter carriages such that said shifting carriages move in unison to shift individual or groups of plates/cell frames in said stack.

5. The improvement of claim 4 in which said means for connecting includes a pair of lead screws, motor means for driving one of said screws in clockwise or counterclockwise direction, a threaded block on each of said shifter carriages in engagement with a respective one of said screws for moving said shifter carriages in forward and reverse directions with respect to said rails, a pair of right angle gear boxes extending between said screws and an index phase box for synchronizing movement of said plates/cell frames by said shifter carriages.

6. The improvement of claim 1 further comprising means for automatically maintaining a constant plate/cell frame closing force.

7. The improvement of claim 1 in which said at least one cylinder comprises four parallel double-acting hydraulic cylinders.

8. The improvement of claim 1 further comprising a check valve on said at least one cylinder for allowing normal hydraulic pressure in said at least one cylinder as a function of internal pressure in said plate/cell frame and being operable to close upon occurrence of hydraulic failure.

9. In a press for holding a stack of filter plates/cell frames on a pair of side rails, said press including a fixed bracket, a movable follower for closing and sealing said stack against a fixed head piece, and at least one closing cylinder on said bracket and having an associated piston rod extending between said bracket and said follower orthogonal to said follower; the improvement comprising first means extending between said bracket and said follower and in engagement with said follower juxtaposed to a first side of said press and extending parallel to said at least one cylinder for providing rectilinear motion of said follower; and a second means extending between said bracket and said follower and in engagement with said follower juxtaposed to a second side of said press opposite said first side of said press and parallel to said first means for providing co-parallel rectilinear motion of said follower; and in which said first means and second means comprise a pair of vertically disposed scissor mechanism each including a first leg connected between a top section of said bracket and a bottom section of said follower and a second leg connected between a bottom section of said bracket and a top section of said follower on each side of said press, said scissor mechanisms each including a pivot pin extending through a mid-span of a respective pair of said first and second legs.

10. The improvement of claim 9 in which said scissor mechanisms are connected to opposed sections at one end of said bracket and said follower in a fixed pivot and are connected to opposed sections of said bracket and said follower at a second end thereof by a pin slidable in a slot in each of said opposed sections at said second end.

11. The improvement of claim 9 further comprising means for adjusting alignment of said scissor mechanisms to insure that said follower is parallel to said head piece.

12. The improvement of claim 9 further comprising means operable upon contact of said follower with said stack and the closure of said stack for disengaging said scissors mechanism.

13. The improvement of claim 12 in which said means for disengaging comprising a detent-containing arm extending from one of said legs and a pressure-actuated detent ball and wherein disengagement of said ball from said detent permits said follower to conform to a face of said stack.

14. The improvement of claim 13 wherein said detent ball is spring-activated.

15. The improvement of claim 13 wherein said detent ball is operable by a hydraulic cylinder.

16. The improvement of claim 9 further comprising a second scissors mechanism horizontally disposed between and connected to said bracket and said follower to give planar parallelism of said follower with respect to said bracket.

17. In a press for holding a stack of filter plates/cell frames on a pair of side rails, said press including a fixed bracket, a movable follower for closing and sealing said stack against a fixed head piece, and at least one closing cylinder on said bracket and having an associated piston rod extending between said bracket and said follower orthogonal to said follower; the improvement comprising first means extending between said bracket and said follower and in engagement with said follower juxtaposed to a first side of said press and extending parallel to said at least one cylinder for providing rectilinear motion of said follower; and a second means extending between said bracket and said follower and in engagement with said follower juxtaposed to a second side of said press opposite said first side of said press and parallel to said first means for providing co-parallel rectilinear motion of said follower; and in which said first means and second means comprise a pair of scissor mechanisms extending on opposite sides of said press and between said bracket and said follower.

18. In a press for holding a stack of filter plates/cell frames on a pair of side rails, said press including a fixed bracket, a movable follower for closing and sealing said stack against a fixed head piece, and at least one closing cylinder on said bracket and having an associated piston rod extending between said bracket and said follower orthogonal to said follower; the improvement comprising first means extending between said bracket and said follower and in engagement with said follower juxtaposed to a first side of said press and extending parallel to said at least one cylinder for providing rectilinear motion of said follower; and a second means extending between said bracket and said follower and in engagement with said follower juxtaposed to a second side of said press opposite said first side of said press and parallel to said first means for providing co-parallel rectilinear motion of said follower;

means operable upon closure of said stack by said follower for disengaging said first means and second means from said follower; and wherein said means for disengaging includes at least one hydraulic cylinder activated by a pressure switch sensing pressure in said cylinder, said means for disengaging being operable as a stack closing pressure is reached to disengage said first means and said second means.

* * * * *